April 10, 1928.
B. D. BARTON
1,665,765
PUMP ATTACHMENT FOR MOTOR VEHICLES
Filed Feb. 15, 1926
2 Sheets-Sheet 2
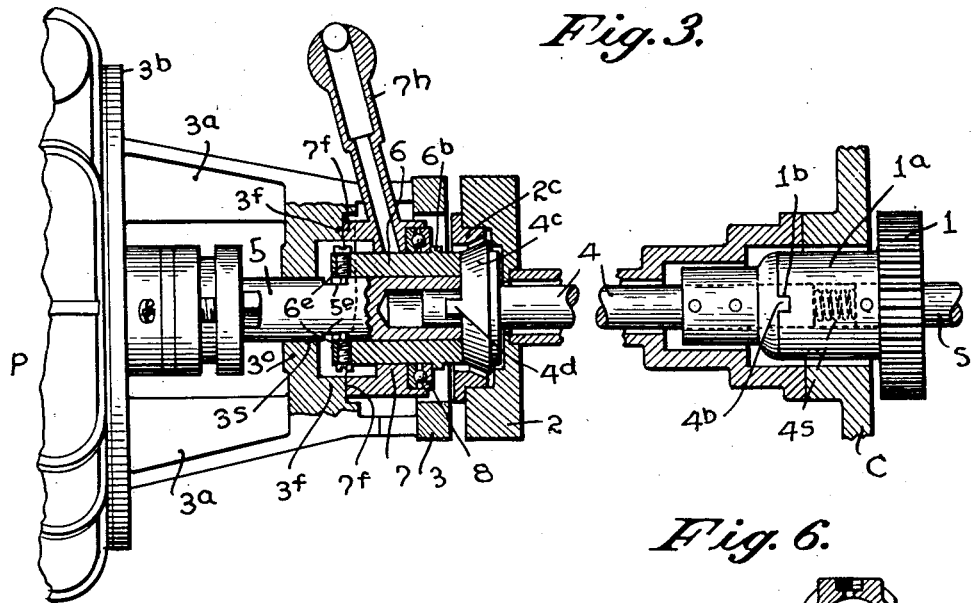
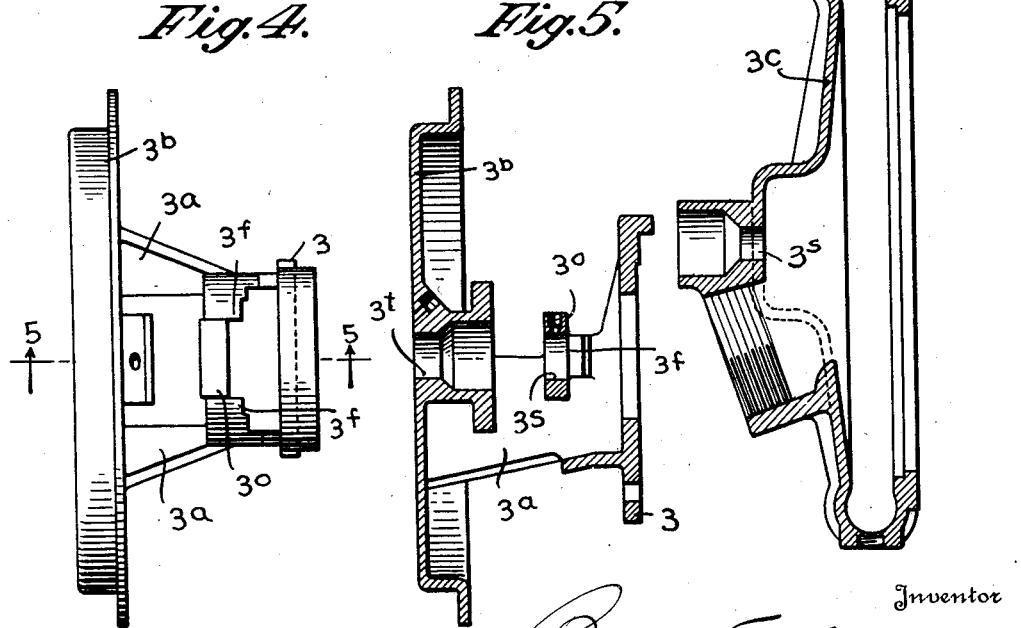
Inventor
Ben D. Barton
By Alexander Powell
Attorneys Patented Apr. 10, 1928.

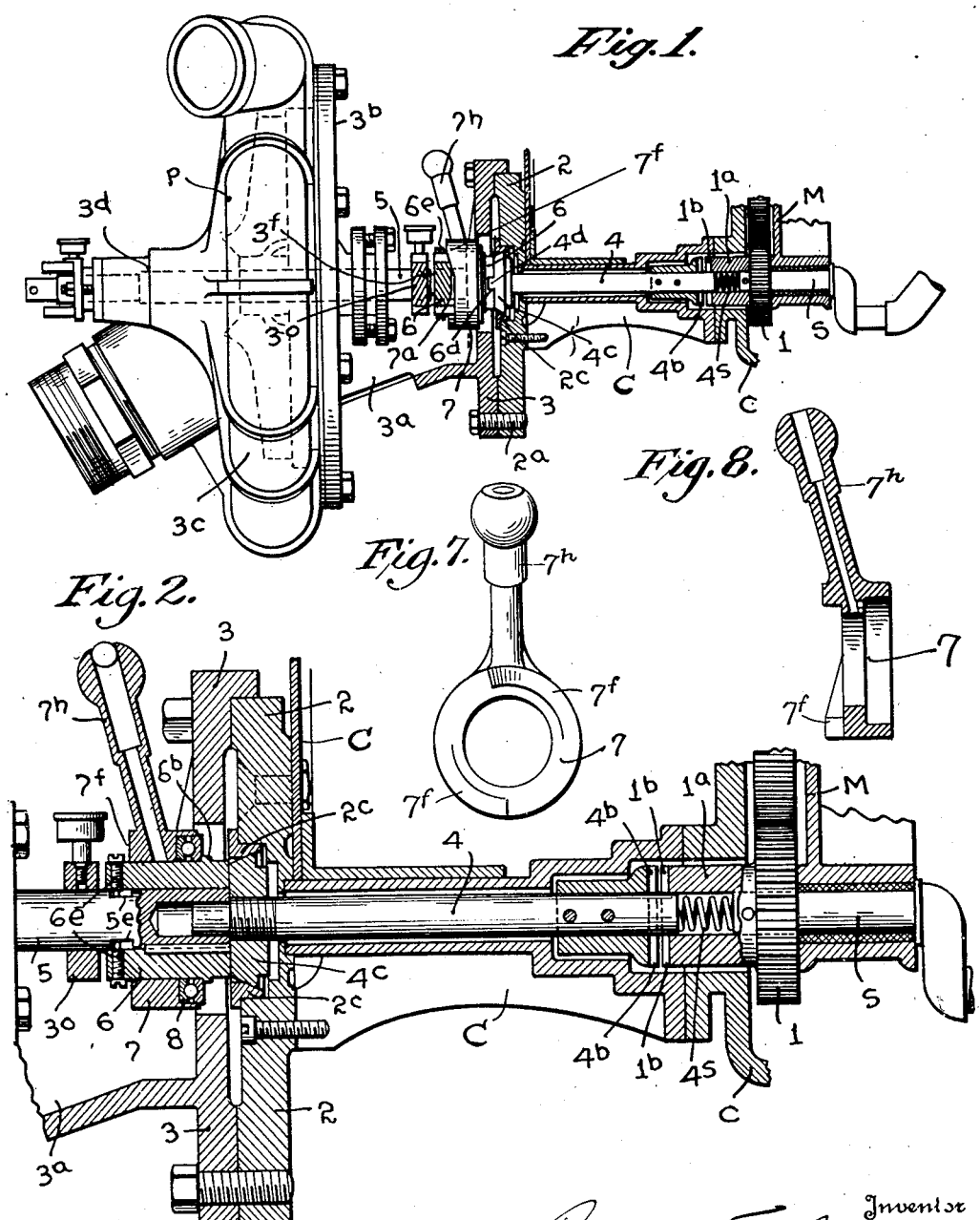

1,665,765

UNITED STATES PATENT OFFICE.

BEN D. BARTON, OF BATTLE CREEK, MICHIGAN, ASSIGNOR TO AMERICAN STEAM PUMP COMPANY, OF BATTLE CREEK, MICHIGAN, A CORPORATION OF MICHIGAN.

PUMP ATTACHMENT FOR MOTOR VEHICLES.

Application filed February 15, 1926. Serial No. 88,421.

This invention is an improvement in power attachments for motor vehicles, of the type shown in my Patent No. 1,538,881, dated May 26, 1925, and the principal object of the present invention is to provide an improved attachment of this character adaptable for use with a great variety of motor vehicles.

One object of this invention is to provide improved clutch means between the pump shaft and the motor shaft. Another object is to provide a novel construction permitting engagement and disengagement of the clutch means, and for taking up the end thrust of the pump motor when in operation.

Another object is to dispense with a thrust collar as shown in the said patent, and to provide anti-friction ball bearing means in the thrust take up devices. Other minor objects and advantages of the invention will be hereinafter explained.

The accompanying drawings illustrate one practical embodiment of the invention and I will explain the same in detail with reference to said drawings to enable others to readily understand and use the same, and refer to the claims for summaries of the essential features of the invention and novel combinations and novel constructions of the parts for which protection is desired.

In said drawings:

Figure 1 is a part longitudinal section and part side elevation of the complete attachment.

Figure 2 is an enlarged vertical section thereof.

Figure 3 is a similar longitudinal section.

Figure 4 is a top view of the pump casing head member.

Figure 5 is a vertical section thereof on line 5—5 of Fig. 4.

Figure 6 is a vertical section through the outer pump casing member.

Figure 7 is a detail view of the throw out member.

Figure 8 is a sectional view thereof.

Referring to the drawings, C represents part of the forward end of the chassis of a motor vehicle which may be of any suitable type; and M part of the engine or motor, mounted on the chassis, and S the driving shaft mounted in the chassis and operated by such motor in the usual manner.

In cases where the machine is ordinarily provided with a gear 1 on the driving shaft S, I attach to the shaft exterior to the gear a forwardly projecting sleeve-like member $1^a$ terminating in a clutch member $1^b$. This member $1^a$ may be pinned to the shaft or otherwise suitably attached thereto. A bracket 2 is usually provided to support the forward engine hanger and the end of the cranking spindle. The form of this bracket 2 is varied to suit the particular chassis to which it is to be attached, and said bracket 2 is securely attached to the chassis frame in any suitable way. This bracket provides a support for the member 3, which latter is preferably detachably secured to the bracket 2 as hereinafter explained, said bracket 2 and member 3 being provided with suitable holes to receive bolts $2^a$ by which they are securely fastened together.

Mounted between the bracket 2 and the coupling member $1^b$ is a coupling shaft 4 which takes the place of the usual cranking spindle and can be used as such when desired. The inner end of said coupling shaft 4 projects into the sleeve $1^a$, and said shaft is provided with a clutch member $4^b$ coacting with the clutch member $1^b$; said shaft 4 being movable longitudinally to engage and disengage said clutch members. A suitable spring, preferably a coiled spring $4^x$ is arranged within the hub $1^a$ to urge the coupling shaft 4 to clutch disengaging position. (See Figs. 1 and 2). Said shaft 4 is also provided with a clutch member $4^c$ on its outer end which member is preferably adjustably secured upon the shaft 4 (as by screw threads) and can be secured in adjusted position by any suitable means. This member $4^c$ is provided with clutch members $4^d$ on its outer face adapted to engage opposed clutch members $6^d$ on a sleeve 6 hereinafter referred to.

The internally tapered ring $2^c$ can be readily inserted in a straight bore in the bracket 2 to receive the tapered clutch member $4^e$ as shown.

When the coupling shaft 4 is de-clutched from shaft 1 (as indicated in Fig. 2) the coupling member $4^c$ is engaged and supported by a bushing $2^c$ arranged in an opening in the bracket 2, and preferably the periphery of members $4^c$ is tapered opposite to the taper in the bushing $2^c$ so that when the member $4^c$ is engaged with the bushing, as shown in Fig. 2, it is not only centered in the bushing but has a tight fit therein so as to prevent rattling of the shaft 4 when in the position shown in Fig. 2.

The principal object of bracket 2 is to support a centrifugal pump P in operative alignment with the shaft 4 and the form of bracket 2 can be changed, as is obvious, to enable it to be readily attached to the chassis of different makes of motor vehicles, and as these vary in structure the bracket 2 will be varied in form but not in substance to enable it to be attached to any particular type of motor vehicle on which it may be desired to mount a pump. The particular construction of the bracket 2 will therefore be varied as regards the form and provision of means for attachment thereof to the chassis in accordance with the make of chassis, such changes being merely matters of form; can be readily made by a skilled mechanic without instructions and do not require specific illustrations or description herein.

The supporting member 3 in the construction shown is a part of the centrifugal pump P, instead of being a separate piece to which the pump is bolted, as in my aforesaid patent. As shown the member 3 is integrally connected by a web portion $3^a$ with an integral member $3^b$ which forms the inboard head of the pump P, such pump comprises the inboard member of head $3^b$, an outboard member $3^c$ and a rotor (not shown) mounted on a shaft 5 which is shown as journaled in a bearing $3^s$ in the member $3^c$ and a bearing $3^t$ in the head $3^b$ as shown.

The particular construction of the pump P may be varied to suit the manufacturer, the specific construction of the pump as a whole not being a feature of the invention; the only essential feature being that the pump and the supporting member 3 when assembled are practically a unit and is bodily attachable to or removable from the bracket 2 as a unit.

Splined on the inner end of the pump shaft 5 is a sleeve 6 having clutch faces $6^d$ adapted to engage with the clutch faces $4^d$ on coupling member $4^c$ to connect the shaft 5 with the coupling shaft 4 when the pump is mounted on the bracket 2; the said clutch being disconnected when the frame is removed. The clutch faces of the parts 6 and $4^c$ are engaged at all times when the pump is mounted on bracket 2.

Rotatably mounted upon the sleeve 6 is a throw out member comprising an annulus 7 provided with a handle $7^h$ by which it can be operated; said annulus is provided on its outer face with cam faces $7^t$ which are adapted to engage opposed cam faces $3^t$ preferably formed integral with the casting 3 as indicated in the drawings. As stated the cam faces $7^t$ abut against cam faces $3^t$ on member 3 and the inner end of annulus 7 abuts against a collar or flange $6^h$ (Figs. 2 and 3) on sleeve 6 so that when the annulus 7 is turned in one direction the cam faces $7^t$ will engage cam faces $3^t$ and force the sleeve 6 inwardly or towards the shaft S, and—(as clutch faces $4^d$, and $6^d$ are always engaged when the pump member 3 is attached to bracket 2)—move shaft 4 inwardly against the action of spring $4^s$ and cause the clutch members $4^b$ to engage clutch member $1^b$, thereby operatively connecting the driving shaft S with the coupling shaft 4, and the latter will then operate the driven shaft 5, see Figure 3.

As the clutch sleeve 6 is returned to the position indicated in Figure 2 the spring $4^s$ pushes shaft 4 toward shaft 5 thereby disengaging clutch member $4^b$ from member $1^b$, so that the shaft 4 is no longer operatively driven by the shaft S, although clutch faces $6^d$ and $4^d$ remain engaged.

Preferably an anti-friction bearing 8, consisting as usual of opposed rings and interposed balls is interposed between the shoulder $6^b$ and the inner face of the throw out member 7 (see Figs. 2 and 3), said member being preferably recessed as shown to accommodate said bearing.

In order to take up the end thrust of the pump rotor on the shaft 5 when the pump is in operation the rear end of the sleeve 6 is provided with radially disposed pins or screws $6^e$, the inner ends of which engage opposite longitudinal slots $5^e$ in the shaft 5 (see Figs. 2 and 3); these slots being long enough to permit the sleeve to be moved to cause the engagement of the clutch member $4^b$ with clutch member $1^b$ or permit its disengagement as described; but when the clutch sleeve has been moved sufficiently to cause the engagement of the clutch member $4^b$ with member $1^b$, the screws $6^e$ abut against the innermost ends of the slots $5^e$ (see Fig. 3), and the end thrust of the shaft 5 due to the action of the pump rotor is then transmitted through the screws $6^e$, sleeve 6, shoulder $6^b$, the anti-friction ring 8 and throw out member 7, to the member 3. The thrust of the pump runner on the pump shaft is thus transmitted through the two screws $6^e$ above mentioned to the ball bearing and therethrough directly to the member 3 with the least possible friction; and does away with the thrust collar shown in said patent; and as ball bearing 8 practically eliminates all friction the thrust becomes negligible.

This invention materially cheapens the cost of construction of the pump attachment and enables me to simply and easily attach such a pump to many different makes of motor vehicles; as each make of such vehicles has a different chassis, each presents different problems and requires some modification in the general form of the bracket 2 in order to readily and securely attach it in a practical way to the chassis of such motor vehicle; in order that the pump shaft and connecting shaft may be properly aligned with the motor driving shaft.

Modification in the form of bracket 2 to facilitate attaching it to any given chassis is obviously a mere matter of mechanical skill and all such modifications I consider within the scope of the invention.

I claim:

1. The combination in a structure of the class described, of a chassis, a driving shaft carried by the chassis, a supporting bracket mounted on the chassis, a centrifugal pump detachably secured to said bracket, a coupling shaft interposed between the driving shaft and pump shaft to transmit motion from the former to the latter, clutch means for connecting the coupling shaft to the driving shaft, spring means for disengaging said clutch means when the supporting bracket is removed or when the clutch means permits; a sleeve on said pump shaft, means for interlocking the sleeve and coupling shaft when the pump is attached to the bracket, cam-means for moving the sleeve to cause the engagement or disengagement of the said clutch at will, and means for engaging the sleeve and pump shaft to prevent further longitudinal inward movement of the sleeve on the shaft when the clutch is engaged, whereby end thrust of the pump is transmitted through the sleeve to the pump bracket.

2. In combination a chassis, a driving shaft thereon; a pump support, a centrifugal pump having a shaft, a coupling shaft interposed between the driving shaft and pump shaft; interengaging clutch devices on the coupling shaft and driving shaft, a spring for normally disengaging said devices, a sleeve on the pump shaft; devices for interlocking said sleeve with the coupling shaft; a cam member engaging the sleeve and opposed surfaces on the pump support; and means for engaging the sleeve and pump shaft to prevent further longitudinal inward movement of the sleeve on the shaft when the clutch is engaged, whereby when the cam member is shifted to move the sleeve to cause engagement of the clutch devices of the coupling shaft and driving shaft end thrust of the pump shaft will be transmitted through said sleeve and cam member to the pump support.

3. In combination a chassis, a driving shaft thereon; a pump support on the chassis, a centrifugal pump having a shaft, a coupling shaft interposed between the driving shaft and pump shaft; interengaging clutch devices on the coupling shaft and driving shaft, a collared sleeve on the pump shaft; devices for interlocking said sleeve with the coupling shaft; a cam member interposed between the collar on the sleeve and opposed surfaces on the pump support; and members on the sleeve to engage the pump shaft whereby when the cam member is shifted to move the sleeve to cause engagement of the clutch devices of the coupling shaft and driving shaft, end thrust of the pump shaft will be transmitted through said sleeve and cam member to the casing member.

4. In combination a chassis, a driving shaft thereon; a centrifugal pump mounted on the chassis; a coupling shaft interposed between the driving shaft and pump shaft; interengaging clutch means on the coupling shaft and driving shaft, a sleeve on the pump shaft; devices for interlocking said sleeve with the coupling shaft when the pump is in position; a cam member engaging the sleeve and fixed cam surfaces on the pump support; means for engaging the sleeve and pump shaft to prevent further longitudinal inward movement of the sleeve on the shaft when the clutch is engaged, whereby the cam member is shifted to move the sleeve to cause engagement of the clutch devices of the coupling shaft and driving shaft the end thrust of the pump shaft is transmitted through said sleeve and cam member to the chassis; and an anti-friction ball race interposed between the sleeve and said cam member.

5. In combination a chassis, a driving shaft thereon; a pump support on the chassis; a centrifugal pump mounted on said support; a coupling shaft interposed between the driving shaft and pump shaft; interengaging clutch means on the coupling shaft and driving shaft, a sleeve on the pump shaft: devices for interlocking said sleeve with the coupling shaft when the pump is in position; said sleeve having a collar; a cam member interposed between said collar on the sleeve and fixed cam surfaces on the pump support; an anti-friction ball race interposed between the collar on the sleeve and the said cam member, and means on the sleeve slidably engaging the pump shaft, whereby the cam member is shifted to move the sleeve to cause engagement of the clutch devices of the coupling shaft and driving shaft the end thrust of the pump shaft is transmitted through said sleeve and cam member to the casing member.

6. In combination a chassis, a driving shaft thereon; a supporting bracket attached to the chassis; a centrifugal pump attached to the bracket and having a shaft; a coupling shaft interposed between the driving shaft and pump shaft; clutch means for engaging the coupling shaft with the driving shaft, a sleeve on the pump shaft; devices for interlocking said sleeve with the coupling shaft when the pump is in position; said sleeve having a collar; a cam member interposed between said collar on the sleeve and opposed cam surfaces on the supporting bracket; screws on the sleeve slidably engaging slots in the pump shaft whereby when the cam member is shifted to move the sleeve to cause engagement of the clutch devices of the coupling shaft and driving shaft the end thrust of the pump shaft is transmitted through said sleeve and cam member to the bracket.

7. In combination a chassis, a driving shaft thereon; a supporting bracket attached to the chassis; a centrifugal pump attached to the bracket and having a shaft; a coupling shaft interposed between the driving shaft and pump shaft; clutch means for engaging the coupling shaft with the driving shaft, a spring for normally disengaging said shaft, a sleeve on the pump shaft; devices for interlocking said sleeve with the coupling shaft when the pump is in position; said sleeve having a collar; a cam member interposed between said collar on the sleeve and opposed cam surfaces on the pump casing; an anti-friction ball race interposed between the flange on the sleeve and the said cam member; and screws on the sleeve slidably engaging slots in the pump shaft whereby when the cam member is shifted to move the sleeve to cause engagement of the clutch devices of the coupling shaft and driving shaft the end thrust of the pump shaft is transmitted through said sleeve and cam member to the bracket.

8. In combination a driving shaft, a pump support, a centrifugal pump thereon, clutch means for interlocking the said driving shaft and pump shaft; a sleeve on the pump shaft for controlling said clutch means; a cam member engaging the sleeve, and means for engaging the sleeve and pump shaft to prevent further longitudinal inward movement of the sleeve on the shaft when the clutch is engaged, whereby when the cam member is shifted on the sleeve to cause engagement of the clutch means the end thrust of the pump shaft will be transmitted through said sleeve and cam member to the pump support.

9. In combination a driving shaft, a pump support, a centrifugal pump thereon having a shaft, a sleeve on the pump shaft; clutch means for interlocking said sleeve with the driving shaft; a cam member engaging the sleeve and opposed surfaces on the pump support, an anti-friction ring interposed between the sleeve and cam member; and members on the sleeve adapted to engage the pump shaft; whereby when the cam member is shifted to move the sleeve to cause engagement of the clutch means the end thrust of the pump shaft will be transmitted through said sleeve and cam member to the pump support.

10. In combination a driving shaft, a pump support, a centrifugal pump thereon having a shaft, and a collared sleeve on the pump shaft; clutch means for interlocking said sleeve with the driving shaft; a cam member interposed between the collar on the sleeve and opposed surfaces on the pump support; and means for engaging the sleeve and pump shaft to prevent further longitudinal inward movement of the sleeve on the shaft when the clutch is engaged, whereby when the cam member is shifted to move the sleeve to cause engagement of the clutch devices of the clutch means the end thrust of the pump shaft will be transmitted through said sleeve and cam member to the pump support.

11. In combination a shaft, means for driving said shaft, a pump shaft, clutch means for interlocking the said shaft and pump shaft; a sleeve for controlling said means; a cam member engaging the sleeve, and means for engaging the sleeve and pump shaft to prevent further longitudinal inward movement of the sleeve on the shaft when the clutch is engaged, whereby when the cam member is shifted on the sleeve to cause engagement of the clutch means the end thrust of the pump shaft will be transmitted through said sleeve and cam member.

12. In combination a shaft, means for driving said shaft, a second shaft, a support, a sleeve on the second shaft; clutch means for interlocking said sleeve with the first shaft; a cam member engaging the sleeve and opposed surfaces on the support, an anti-friction ring interposed between the sleeve and cam member; and members on the sleeve adapted to engage the second shaft; whereby when the cam member is shifted to move the sleeve to cause engagement of the clutch means end thrust on the second shaft will be transmitted through said sleeve and cam member to the support.

13. In combination a supporting member, a shaft, means for driving said shaft, a second shaft, and a collared sleeve on the second shaft; clutch means for interlocking said sleeve with the first shaft; a cam member interposed between the collar on the sleeve and opposed surfaces on the supporting member and means whereby when the cam member is shifted to move the sleeve to cause engagement of the clutch devices of the clutch means the end thrust on the second shaft will be transmitted through said sleeve and cam member to the supporting member.

14. In combination a chassis, a driving shaft thereon; a pump support, a centrifugal pump having a shaft, a coupling shaft interposed between the driving shaft and pump shaft; interengaging clutch devices on the coupling shaft and driving shaft, a sleeve on the pump shaft; and devices for interlocking said sleeve with the coupling shaft to prevent further inward movement of the sleeve on the shaft when the clutches are engaged, whereby the thrust of the pump shaft is transmitted to the pump support through the sleeve.

15. The combination in a structure of the class described, of a chassis, a driving shaft carried by the chassis, a supporting bracket mounted on the chassis, a centrifugal pump detachably secured to said bracket, a coupling shaft interposed between the driving shaft and pump shaft to transmit motion from the former to the latter, clutch means for connecting the coupling shaft to the driving shaft, spring means for disengaging said clutch means when the supporting bracket is removed; a sleeve on said pump shaft, means for interlocking the sleeve and coupling shaft when the pump is attached to the bracket, cam means for moving the sleeve to cause the engagement or disengagement of the said clutch, and means for engaging the sleeve with the shaft to prevent further longitudinal inward movement of the sleeve on the shaft when the clutch is engaged, whereby end thrust of the pump shaft is transmitted to the bracket.

16. In combination, a support, a driving shaft mounted thereon, a centrifugal pump casing rigidly connected with the support, clutch members for connecting the pump shaft with the driving shaft, a sleeve on the pump shaft, a cam member for engaging or disengaging the clutch members rotatably mounted on the sleeve and interposed between a shoulder on said sleeve and opposed surfaces on the pump casing, and means for engaging the sleeve with the pump shaft when the clutch members are engaged to prevent further longitudinal inward movement of the sleeve on the shaft, whereby the end thrust on the pump shaft is transmitted through said sleeve and cam member to the pump casing.

17. In combination, a support, a driving shaft mounted thereon, a centrifugal pump having an inboard head and a supporting portion spaced from but rigidly connected with the inboard head; means for attaching the said portion to the support to hold the pump shaft in alinement with the driven shaft; clutch means for connecting the pump shaft with the driving shaft, a sleeve on the pump shaft for engaging or disengaging the clutch means, and means for engaging the sleeve with the shaft when the clutch is engaged to prevent further longitudinal inward movement of the sleeve on the shaft whereby the end thrust on the pump shaft is transmitted through said sleeve to the said supporting portion.

18. In combination, a support, a driving shaft mounted thereon, a centrifugal pump having an inboard head and a supporting portion spaced from but rigidly connected with the inboard head; means for attaching the said member to the support to hold the pump shaft in alinement with the driving shaft; means for connecting the pump shaft with the driving shaft, a sleeve on the pump shaft; a cam member for engaging or disengaging the clutch members rotatably mounted on the sleeve and interposed between a shoulder on said sleeve and cam surfaces on said supporting portion; and means for engaging the sleeve with the shaft when the clutch is engaged to prevent further longitudinal inward movement of the sleeve on the shaft, whereby the end thrust on the pump shaft is transmitted through said sleeve and cam member to the said supporting portion.

In testimony that I claim the foregoing as my own, I affix my signature.

BEN D. BARTON.